United States Patent
Muenzenmayer et al.

(10) Patent No.: US 7,130,465 B2
(45) Date of Patent: Oct. 31, 2006

(54) METHOD FOR EXTRACTING TEXTURE FEATURES FROM A MULTICHANNEL IMAGE

(75) Inventors: Christian Muenzenmayer, Nuremberg (DE); Thomas Wittenberg, Erlangen (DE); Robert Couronné, Erlangen (DE); Heiko Kuziela, Erlangen (DE); Matthias Grobe, Regensburg (DE); Klaus Spinnler, Erlangen (DE)

(73) Assignee: Fraunhofer-Gesellschaft zur Foerderung der angewandten Forschung e.V(DE)

( * ) Notice: Subject to any disclaimer, the term of this patent is extended or adjusted under 35 U.S.C. 154(b) by 100 days.

(21) Appl. No.: 11/055,665

(22) Filed: Feb. 8, 2005

(65) Prior Publication Data

US 2005/0196037 A1    Sep. 8, 2005

Related U.S. Application Data

(63) Continuation of application No. PCT/EP02/10193, filed on Sep. 11, 2002.

(30) Foreign Application Priority Data

Aug. 29, 2002  (DE)  ................. 102 39 801

(51) Int. Cl.
  *G06K 9/46*   (2006.01)
  *G06K 9/00*   (2006.01)
  *G06K 9/20*   (2006.01)

(52) U.S. Cl. ..................... 382/190; 382/172

(58) Field of Classification Search ............. 382/132, 382/159, 162, 164, 165–168, 172, 173, 181, 382/190, 195, 212, 218, 224, 274, 283, 284; 345/619; 358/517, 520, 522, 530
See application file for complete search history.

(56) References Cited

U.S. PATENT DOCUMENTS

| | | | |
|---|---|---|---|
| 6,081,612 A | | 6/2000 | Gutkowicz-Krusin et al. |
| 6,469,710 B1 * | | 10/2002 | Shum et al. ................. 345/619 |
| 6,766,055 B1 * | | 7/2004 | Matsugu et al. ............ 382/173 |
| 2002/0106122 A1 | | 8/2002 | Messing et al. |
| 2003/0113017 A1 * | | 6/2003 | Thomas et al. ............. 382/181 |
| 2004/0052414 A1 * | | 3/2004 | Schroder ..................... 382/167 |
| 2005/0196037 A1 * | | 9/2005 | Muenzenmayer et al. .. 382/159 |

FOREIGN PATENT DOCUMENTS

JP    04273587 A    9/1992

OTHER PUBLICATIONS

Jain, Anil K.: Fundamentals of Digital Image Processing; Englewood Cliff, NJ, Prentice Hall, 1989, Seite 418. ISBN: 0-13-336165-9.

(Continued)

*Primary Examiner*—Amir Alavi
(74) *Attorney, Agent, or Firm*—Beyer Weaver & Thomas LLP

(57) ABSTRACT

In a method for extracting texture features from a multichannel image, which comprises a plurality of pixels, information of at least two channels of the image is combined for each of the plurality of pixels, and one or several texture features are determined from the combined pixel information.

7 Claims, 14 Drawing Sheets

OTHER PUBLICATIONS

Singh, M., Markous, M., Singh S.,: "Colour Image Texture Analysis: Dependence on Colour Spaces"; In: Patterns Recognition, 2002, Proceedings. 16th International Conference on Quebec, City, Canada Aug. 11-15, 2002. ISBN: 0-7695-1695-X. Los Alamitos IEEE Comput. Soc. pp. 672-675.

Unser, M.: "Sum and Difference Histograms for Texture Classification"; IEEE Transactions on Pattern Analysis and Machine Intelligence; New York, 1986.

Rosenfeld A., Cheng-Ye Wang, Wu, A. Y.: "Multispectral Texture" IEEE Transactions on Systems, Man and Cybernetics, Bd. SMC-12, Nr. 1, 1982, pp. 79-84; XP008029826.

Martinez-Cabeza-De-Vaca-Alajarin, J. et al.: "Marble Slabs Quality Classification System Using Texture Recognition and Neural Networks Methodology"; 7th European Symposium on Artificail Neural Networks. Proceedings of Esann'99, Bruges, Belgium, Apr. 21-23, 1999, pp. 75-80, XP002277169, 1999.

Haralick, R.M.: "Texture Features for Image Classification", IEEE Transactions on Systems, Man and Cybernetics, vol. SMC-3, No. 6; pp. 610-621, Nov. 1973.

Panjwani, D.K. et al.: "Markov Random Field Models for Unsupervised Segmentation of Textured Color Images"; IEEE Transactions on Pattern Analysis and Machine Intelligence, IEEE Inc. New York, US, Bd. 17, Nr. 10, Oct. 1, 1995, pp. 939-954, XP000532200 ISSN: 0162-8828.

Chen, Y. Q. et al.: "Statistical Geometrical Features for Texture Classification"; Pattern Recognition, Pergamon Press Inc., Elmsford, NY, Bd. 28, Nr. 4, Apr. 1, 1995, pp. 537-552, XP004013169, ISSN: 0031-3203.

Jain, A. and Healey, G.: "A Multiscale Representation Including Opponent Color Features for Texture Recognition"; IEEE Transactions on Image Processing, Jan. 1998.

PCT/ISA; German PCT/EP 02/10193 dated Sep. 11, 2002.

Translation of PCT/IPEA 416; PCT/EP 2002/010193 dated Sep. 11, 2002.

* cited by examiner

| feature | equation |
|---|---|
| sum average value | $c_0 = \mu_s = \sum_i i \hat{P}_s(i)$ |
| sum variance | $c_1 = \sum_i (i-\mu_s)^2 \hat{P}_s(i)$ |
| sum energy | $c_2 = \sum_i \hat{P}_s^2(i)$ |
| sum entropy | $c_3 = -\sum_i \hat{P}_s(i) \log \hat{P}_s(i)$ |
| difference average value | $c_4 = \mu_d = \sum_j j \hat{P}_D(j)$ |
| difference variance | $c_5 = \sum_j (j-\mu_d)^2 \hat{P}_D(j)$ |
| difference energy | $c_6 = \sum_j \hat{P}_D^2(j)$ |
| difference entropy | $c_7 = -\sum_j \hat{P}_D(j) \log \hat{P}_D(j)$ |
| cluster shadow | $c_8 = \sum_i (i-\mu_s)^3 \hat{P}_s(i)$ |
| cluster prominence | $c_9 = \sum_i (i-\mu_s)^4 \hat{P}_s(i)$ |
| contrast | $c_{10} = \sum_j j^2 \hat{P}_D(j)$ |
| homogenity | $c_{11} = \sum_j \frac{1}{1+j^2} \hat{P}_D(j)$ |
| correlation | $c_{12} = c_1 - c_{10}$ |
| second angular moment | $c_{13} = c_2 \cdot c_6$ |
| entropy | $c_{14} = c_3 + c_7$ |

FIGURE 3

| r | g | b | L* | u* | v* |
|---|---|---|---|---|---|
| 0,00 | 0,00 | 0,00 | 0,00 | - | - |
| 1,00 | 0,00 | 0,00 | 53,24 | 175,02 | 37,76 |
| 0,00 | 1,00 | 0,00 | 87,73 | -83,07 | 107,38 |
| 0,00 | 0,00 | 1,00 | 32,30 | -9,42 | -130,34 |
| 0,16 | 0,00 | 1,00 | 38,82 | 5,70 | -134,09 |
| 1,00 | 1,00 | 1,00 | 100,00 | 0,00 | 0,00 |

FIGURE 5

| $\alpha_0$ | $\Delta\alpha$ | G | $L_{Bins}$ |
|---|---|---|---|
| 4 | 4 | 256 | 63 |
| 8 | 8 | 256 | 31 |
| 16 | 16 | 256 | 15 |
| 32 | 32 | 256 | 7 |

FIGURE 8

| feature | equation |
|---|---|
| maximum value | $g_{max} = \max_\alpha g(\alpha)$ |
| average value | $\mu_g = \frac{1}{L_{Bins}} \sum_\alpha g(\alpha)$ |
| sample average value | $\mu_{g\alpha} = \frac{1}{\sum_\alpha g(\alpha)} \sum_\alpha \alpha g(\alpha)$ |
| sample s.d. | $\sigma_{g\alpha} = \sqrt{\frac{1}{\sum_\alpha g(\alpha)} \sum_\alpha (\alpha - \mu_{g\alpha})^2 g(\alpha)}$ |

FIGURE 9

| tree | latin | code | images |
|---|---|---|---|
| birch | betula pendula | ba | 68 |
| beech | fagus silvatica | fs | 68 |
| spruce | picea abies | pa | 68 |
| pine | pinus silvestris | ps | 68 |
| oak | quercus robur | qs | 68 |
| robinia | robinia pseudacacia | rs | 68 |
| Σ | | | 408 |

FIGURE 12

| defect | class | images |
|---|---|---|
| healthy point node | Apg | 33 |
| healthy node | Ag | 44 |
| crossgrain | C | 38 |
| normal reference | N | 42 |
| plane defect | T | 21 |
| wood edge | W | 15 |
| pseudo effect | Z | 15 |
| Σ | | 208 |

FIGURE 13

| set | Kum | Bins | d | L | r | Δr |
|---|---|---|---|---|---|---|
| inter-level | (RGB) | | | | | |
| VisTex | no | 511 | 1 | 180 | 98% | 12% |
| BarkTex | no | 511 | 1 | 180 | 87% | 14% |
| Zervix | no | 511 | 0 | 45 | 92% | -4% |
| Wood | no | 511 | 2 | 180 | 69% | 3% |

FIGURE 14

| set | Kum | Bins | d | L | r | Δr |
|---|---|---|---|---|---|---|
| RGB | | | | | | |
| VisTex | no | 883 | 1 | 60 | 85% | -1% |
| BarkTex | no | 883 | 1 | 60 | 75% | 2% |
| Zervix | no | 883 | 2 | 15 | 95% | -1% |
| Wood | no | 883 | 2 | 60 | 65% | -1% |
| L+u*v* | | | | | | |
| VisTex | no | 737 | 1 | 60 | 83% | -3% |
| BarkTex | no | 737 | 1 | 60 | 74% | 1% |
| Zervix | no | 737 | 1 | 60 | 87% | -9% |
| Wood | no | 737 | 2 | 60 | 65% | -1% |

FIGURE 15

| set | Kum | Bins | d | L | $S_{min}$ | r | $\Delta r$ |
|---|---|---|---|---|---|---|---|
| inter-level (H`V) | | | | | | | |
| VisTex | no | 511 | 0 | 45 | 25 | 97% | 11% |
| BarkTex | no | 511 | 1 | 180 | 25 | 81% | 8% |
| Zervix | no | 511 | 0 | 45 | 0 | 86% | -10% |
| Wood | no | 511 | 1 | 180 | 150 | 68% | 2% |
| trigonometrical (H`V) | | | | | | | |
| VisTex | no | 511 | 1 | 120 | 0 | 97% | 11% |
| BarkTex | no | 511 | 1 | 120 | 25 | 85% | 12% |
| Zervix | no | 511 | 1 | 120 | 100 | 92% | - 4% |
| Wood | no | 511 | 2 | 120 | 50 | 71% | 5% |

FIGURE 16

| set | Kum | Bins | d | feature | L | r | $\Delta r$ |
|---|---|---|---|---|---|---|---|
| VisTex | no | 511 | 1 | Inter | 180 | 98% | 12% |
| BarkTex | no | 511 | 1 | Inter | 180 | 87% | 14% |
| Zervix | yes | 883 | 2 | Euklid | 15 | 95% | -1% |
| Wood | no | 511 | 2 | H`V Trig. | 180 | 71% | 5% |

FIGURE 17

| set | operation | Δα | α₀ | L | r | Δr |
|---|---|---|---|---|---|---|
| inter-level (RGB) | | | | | | |
| VisTex | XOR | 16 | 16 | 48 | 99% | 6% |
| BarkTex | XOR | 8 | 8 | 48 | 85% | 20% |
| Zervix | XOR | 8 | 8 | 48 | 89% | 1% |
| Wood | ODER | 4 | 4 | 48 | 74% | 7% |

FIGURE 18

| set | Δα | α₀ | L | S$_{min}$ | r | Δr |
|---|---|---|---|---|---|---|
| trigonometrical (H´V) | | | | | | |
| VisTex | 8 | 8 | 32 | 0 | 97% | 4% |
| BarkTex | 8 | 8 | 32 | 50 | 82% | 17% |
| Zervix | 8 | 8 | 32 | 50 | 84% | -4% |
| Wood | 8 | 8 | 32 | 150 | 72% | 5% |

FIGURE 19

METHOD FOR EXTRACTING TEXTURE FEATURES FROM A MULTICHANNEL IMAGE

CROSS-REFERENCE TO RELATED APPLICATION

This application is a continuation of copending International Application No. PCT/EP2002/10193, filed Sep. 11, 2002, which designated the United States and was not published in English.

BACKGROUND OF THE INVENTION

1. Field of the Invention

The present invention relates to a method for extracting texture features from a multichannel image, and here particularly to a method for extracting color texture features for automatic classification and segmentation.

2. Description of the Related Art

Recently, more and more color cameras are used in industrial and medical image processing for generating/capturing the images to be examined.

Typical medical applications of such color cameras are, e.g. classification and segmentation of skin melanomas, classification of dysplastic and cancerous cells, e.g. cervix or sputum cells, in microscopy, or the differentiation of healthy, dysplastic or diseased tissue or mucous membrane in endoscopic examinations of oral cavity, throat, larynx, oesophagus, stomach and intestines. Examples for an industrial application of such cameras are classification and examination of wood trunks based on their bark or the cut surface, automatic identification and separation of garbage types on a conveyor belt or support in cartography by satellite pictures.

In the different named fields of application, such colored images captured by color cameras can serve as a base for classification as well as segmentation of the image content. Depending on the application case and specific boundary conditions, either viewing of the whole image or merely one or several image portions, the so-called region of interest (ROI) is performed. In this context, classification means the assignment of one or several object represented in the image to a specific class. In this context, however, segmentation is seen as the determination of such objects by useful integration of individual pixels to larger (object) units, which means a classification and assignment, respectively, of pixels to so-called object classes.

So-called features, which can be calculated from color and the gray value intensities, respectively, of pixels or small groups of pixels serve as a base for such an object and pixel classification, respectively. The calculation of such features from gray level images is thereby based on a skilful integration of the gray levels of the pixels of the viewed image portion. Examples of such simple features are, for example, first order statistics, such as frequency of gray levels (histograms), mean values and variances of the viewed gray levels in such an image portion. More complex features, by which, for example, so-called textures and textured surfaces, respectively, can be described and analyzed, are based, e.g. on higher order statistics, so-called Fourier or Gabor features, run length encodings, geometrical statistical features and the like. Examples of such higher order statistics for describing textured surfaces are, for example, described by R. M. Haralick, et al. in "Texture Features for Image Classification", IEEE Transactions on Systems, Man, and Cybernetics, Vol. SMC-3, No. 6, pages 610–621, November 1973, by M. Unser in "Sum and Difference Histograms for Texture Analysis", IEEE Transactions on Pattern Analysis and Machine Intelligence, Vol. 8, No. 1, pages 118–125, 1986 and by Y. Q. Chen et al. in "Statistical Geometrical Features for Texture Classification", Pattern Recognition, Vol. 28, No. 4, pages 537–552, September 1995.

The disadvantage of these known solutions is that they are limited to the evaluation of intensities gathered from a single channel recording of the image and thus merely enable the determination of texture features in such images. Based on the texture features acquired that way, a classification can conventionally be performed.

In contrast to gray level images, however, it has been determined that color images and particularly information with regard to the statistical distribution of colors are a very powerful and useful classification tool, so that utilization of color information contained in a color image is desirable.

In the prior art, several solutions are known by which the above-mentioned solutions for extracting texture features from gray level images can be converted to multichannel images, such as spectral images with two or more levels. These solutions work such that the analysis steps known from the solutions with regard to the examination of gray level images are applied separately to every channel of the image, which means every image level, and that the resulting texture features are finally integrated to one overall texture feature.

This solution is disadvantageous in that every image level is examined individually, so that the information contained in the actual distribution of the colors of a pixel across the levels are not used for texture feature analysis, but that merely a combination of pixel information contained in all colored channels is performed by a final integration of the separately generated texture features. Thus, no actual combining of the information associated to the individual pixels in the different levels takes place, so that this solution has only slight improvements compared to the conventional "gray level approach", which, however, do not justify the increased computing effort.

SUMMARY OF THE INVENTION

It is the object of the present invention to provide an improved method for extracting texture feature from a multichannel image, which considers the information of a pixel contained in every channel of the image.

The present invention provides a method for extracting texture features from a multichannel image having a plurality of pixels, having the following steps for each of the plurality of pixels: combining pixel information of at least two channels of the image; and determining one or several texture features from the combined pixel information.

Thus, the present invention is based on images captured with more than one spectral range, such as spectral images with generally three spectra (e.g. RGB), and teaches an approach which allows to extract texture features from the spectral images registered together, which are used for later image segmentation and object classification.

According to a preferred embodiment, the inventive method is designed to calculate numerical features (characteristic numbers) of the overall image or arbitrarily formed subregions based on a picture of a multichannel image on image sequence. The image sequence and the image, respectively, can have been generated by an n channel, $n \geq 2$, picture. The calculation of the numerical features for each of the regions is performed by using all or part of the channels of the image, wherein each of the channels can contain color data and color information, respectively, or other multispectral data/information, such as information with regard to IR radiation, UV radiation, X-ray radiation. The features generated that way can then be used with any classificator (K-NN, polynome and others) for classification and segmentation, respectively, of the image and the image portion, respectively.

According to a preferred embodiment of the present invention, the step of combining is repeated until combined image information is present for all combinations of the different channels of the image. Based on the determined texture features, an overall texture feature vector for the multichannel image or the multichannel image portion is generated, wherein the determined individual texture features are stored.

In one embodiment where the channels of the image contain color information, these channels can contain information with regard to the color of the image, the luminance and the chrominance of the image or the hue, the saturation and the value of the image.

Preferably, the step of combining the image information comprises combining pixel information from a pixel of a first channel of the image and a pixel of a second channel of the image, wherein the pixel of the second channel can be offset with regard to the pixel of the first channel.

The pixel information is preferably pixel intensities of the associated pixels, which means intensities at the associated pixel in the respective channel of the image.

According to a first preferred embodiment of the present invention, in one image portion, sum histograms and/or difference histograms of the pixel intensities can be generated from at least two channels, wherein texture features are generated based on the generated histograms.

According to a second preferred embodiment, one or several binary masks per channel are generated for combining, by comparing the pixel intensities at associated pixels with a threshold. Preferably, one binary mask is generated for each of the channels of the image. Further, preferably, generating the binary masks comprises logical combining of the pixel intensities of at least two different channels.

With regard to the viewed images or image windows (image portions), it should be noted that these viewed image portions can have any form. Particularly, the form of the viewed image portion can be adapted to the form of the object for which texture features are to be determined. When examining cell nucleuses, the form of the viewed image portion can be chosen such that merely the cell nucleus of interest is included.

BRIEF DESCRIPTION OF THE DRAWINGS

These and other objects and features of the present invention will become clear from the following description taken in conjunction with the accompanying drawings, in which:

FIG. 3 is a table with the sum and difference histogram features according to Unser, generated based on the image shown in FIG. 2 and the image information contained therein;

FIG. 5 is a table where for some trivial color values, the conversion into L*u*v* is combined;

FIG. 8 is a table with typical values for an initial threshold $\alpha_0$, the step size $\Delta\alpha$ and the number of intensities as well as the number of the binary images G that can be generated thereby;

FIG. 9 is a table of the statistical features according to Chen, which are derived based on the geometrical characteristics from the binary stack illustrated in FIG. 7;

FIG. 12 is a table of a BarkText test set (BKV), wherein the texture classes are six different types of trees, of which 68 samples have been taken over;

FIG. 13 is a table of a wood test set, wherein defect classes are shown together with the number of representatives;

FIG. 14 is a table with the best results of the classification obtained based on the interlevel feature extraction according to the first embodiment;

FIG. 15 is a table with the best results of the classification obtained based on the Euclid distance feature extraction according to the first embodiment;

FIG. 16 is a table with the best results of the classification obtained based on the non-linear H'V feature extraction according to the first embodiment by using interlevel differences (top) in the H level and trigonometrical difference measures in the H level (bottom);

FIG. 17 is a table with the best results of the classification obtained based on the color extended feature extraction according to the first embodiment, wherein the improvement measures $\Delta r$ are relative to the best gray scale rates;

FIG. 18 is a table with the best results of the classification obtained based on the interlevel SGF feature extraction according to the second embodiment applied to the RGB color space; and FIG. 19 is a table with the best results of the classification obtained based on the non-linear H'V-SGF feature extraction according to the second embodiment.

DESCRIPTION OF THE PREFERRED EMBODIMENTS

Figure 1:
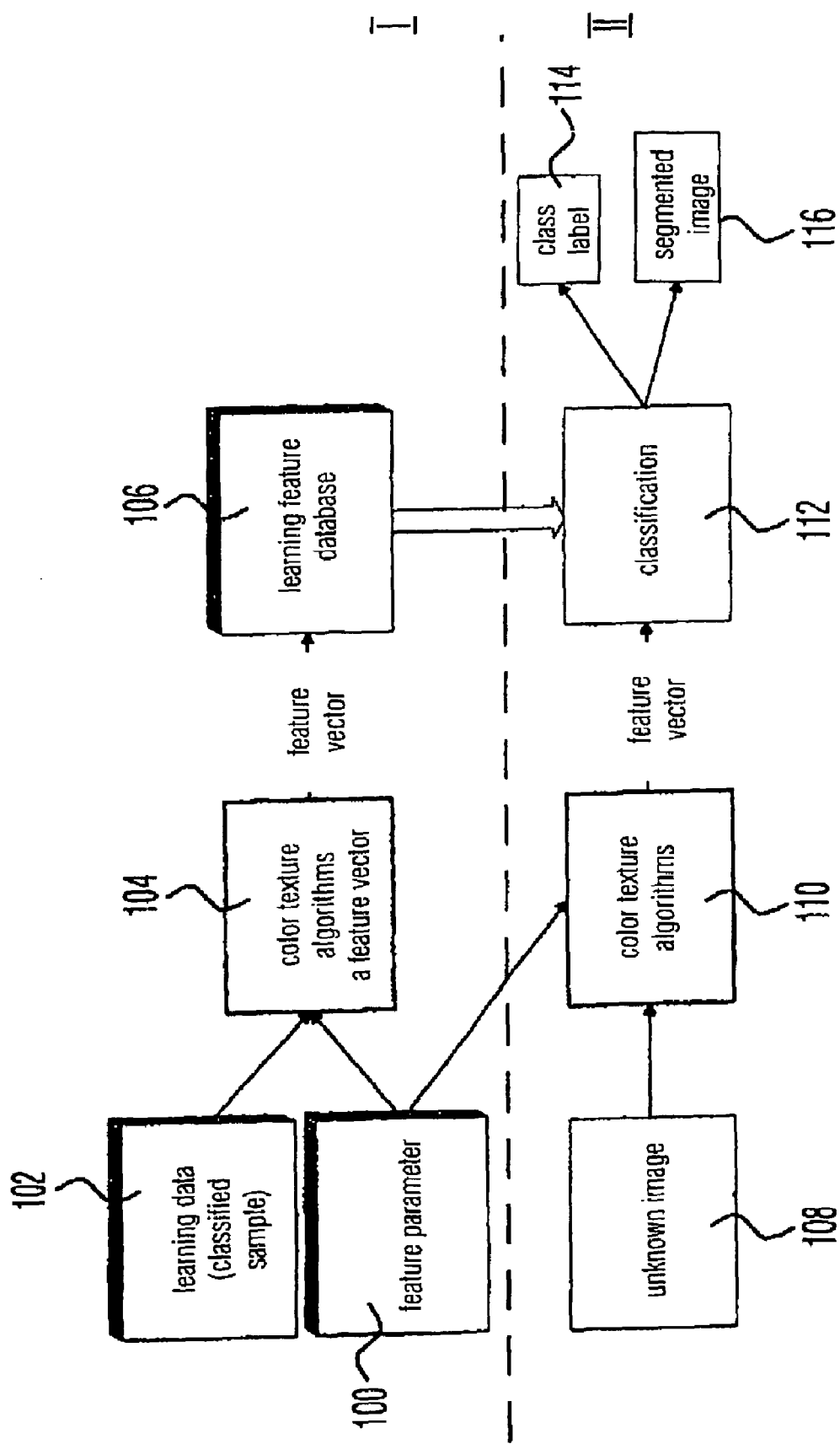
FIG. 1 is a block diagram of a classification and segmentation method using the inventive texture algorithms.

FIG. 1 shows a block diagram of a classification and segmentation method using the inventive texture recognition algorithm. As can be seen in FIG. 1, the method comprises first stage I, the learning stage, and a second stage II, the classification and segmentation stage. First, in the first stage I, known feature parameters are determined (see Block 100). These feature parameters are boundary conditions for the texture feature calculation. In Block 102, learning data are acquired by providing known images or image portions with known (classified) textures, which means already classified samples. The image provided in Block 102, which is already classified, is provided to the inventive color texture algorithm in Block 104 together with the known feature parameters, whereby the numerical features (feature vector) are generated for the known texture contained in image 102, which are then stored in the learning feature database 106 for this texture.

In the second stage II, an unknown image or an image portion 108 is supplied to the method, and the inventive color texture algorithm is applied to the unknown image in Block 110, wherein the color texture algorithm obtains the existing feature parameters from the database 100. Based on the examination of the unknown image 108 via the inventive method and based on the provided feature parameters a feature vector is generated, which contains the different characteristics found by the color texture algorithm in the unknown image 108. This feature vector is supplied to a classification in Block 112, where the classification of the feature vector is performed based on information from the database 106, to perform either a classification 114 of the whole image 108 and a segmentation 116, respectively, by classification of individual pixels of the image or the image portion 108.

The color texture algorithms mentioned in Blocks 104 and 110 are based on the inventive method according to which, for a multichannel image, such as a spectral image, for each of the pixels pixel information of at least two color channels of the image are combined, to determine therefrom one or several texture features. These texture features are then integrated to the feature vector and supplied to the classification.

With regard to the subsequent figures, preferred embodiments of the inventive method will be described, which is implemented in the algorithms 104, 110.

First Embodiment

A first embodiment of the present invention will be discussed below, where the classification is based on features which are obtained based on sum histograms and/or difference histograms of the pixel intensities in associated pixels in at least two channels/of at least two levels. First, the known approach for intensity images is discussed, which is described in more detail by M. Unser in "Sum and Difference Histograms for Texture Analysis", IEEE Transactions on Pattern Analysis and Machine Intelligence, Vol. 8, No. 1, pages 118–125, 1986.

The above already briefly explained higher order statistics use two one-dimensional histograms (sum and difference histograms). These are histograms counting the frequency of sums and differences of pixel intensities $I(x_1, y_1)$ and $I(x_2, y_2)$ with a certain displacement $(d_x, d_y)$. These are defined as follows:

$$h_S(i) = |\{(x_1,y_1) \in D | I(x_1,y_1)+I(x_2,y_2)=i\}|$$

$$h_D(j) = |\{(x_1,y_1) \in D | I(x_1,y_1)-I(x_2,y_2)=j\}|$$

with:
I=0, . . . , 2(G−1),
j=−G+1, . . . , G−1
G=maximum intensity level per image channel, e.g. 256 intensities,
I=intensity,
$x_i, y_i$=coordinate of a viewed dot in the image,
D=image portion,
$h_S$=sum histogram, and
$h_D$=difference histogram.

These counts have the number of pixel pairs in an image portion D (ROI=Region Of Interest), having a sum with the value i and a difference with the value j, respectively. Both histograms have 2G−1 entries (bins); which correspond to the 511 entries when images with G=256 intensities (e.g. gray levels) are assumed. The quantization to N entries can be performed with regard to the histograms also by rounding by using the following equation:

$$d' = \left[\frac{d(N-1)}{d_{max}} + 0{,}5\right]$$

with:
N=total number of counts, and
$d_{max}$=maximum difference or sum value.

The independence of the histogram entries $h_s(i)$ and $h_D(j)$ is achieved by norming with the total number of counts N of the viewed image portion:

$$N = \sum_{i=0}^{2(G-1)} h_S(i) = \sum_{j=-G+1}^{G-1} h_D(j)$$

$$\hat{P}_S(i) = \frac{h_S(i)}{N}, \quad i = 0, \ldots, 2(G-1)$$

$$\hat{P}_D(j) = \frac{h_D(j)}{N}, \quad j = -G+1, \ldots, G-1$$

with:
$P_s$=normed sum histogram, and
$P_D$=normed difference histogram.

Figure 2:
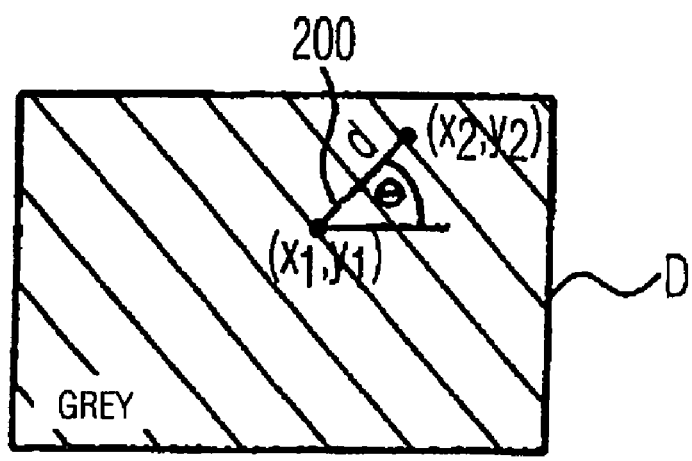
FIG. 2 is a viewed image portion with any form or a viewed overall image (intensity) which is underlying the determination of the histograms.

The displacement vector $(d_x, d_y)$ can be represented by d=radius and θ=angle (see FIG. 2). FIG. 2 shows a viewed image portion or a viewed total image (gray value) D, where the viewed pixels $x_1/y_1, x_2/y_2$ (pixel pair) as well as a vector 200 connecting the pixels is shown. With the sum and difference histograms, second order statistics of the displaced pixel pairs (d, θ) are estimated. Generally, it is sufficient to use values=0, π/4, π/2,3 π/4 for the angle θ for a certain radius d and to calculate the features for each of the histograms separately. In order to introduce a certain degree of rotation invariance, it is possible to accumulate histograms across all four directions and to calculate the features then.

Based on the above described histograms, 15 features are determined, which are shown in the table in FIG. 3. These features describe the characteristics of texture by using, e.g., moments and entropy measures. The difference mean value and the variance $(c_4, c_5)$ characterize the mean intensity difference between adjacent pixels and how uniform this difference is. Thus, a higher value of $c_4$ is an indication for an image with high contrast and many edges. Analogously, mean value and variance are applied to the sum histogram $(c_0, c_1)$ but without an obvious visual interpretation. Concentrated peaks in the histograms are evaluated by the energy measures $(c_2, c_6)$, which will result in large values for homogenous regions in the difference histograms with a peak at d=0. With the entropies $(c_3, c_7)$ and the derived feature $(c_{14})$, information theoretical measures are used, whereby it is determined how "deterministic" the image of a texture is. The contrast characteristic $(c_{10})$ is intuitively clear which weights the occurrence of high intensity differences disproportionately. These features are also referred to as base features.

According to the first embodiment of the present invention, the above described disadvantages of the just described "gray level approach" to use sum histograms and/or difference histograms for classification are avoided by extending this approach to the viewing of several levels. In order to cover also the statistical dependencies between the levels, the texture features are determined based on the above described features across different levels (interlevel). Below, this will also be referred to as interlevel method.

Figure 4:
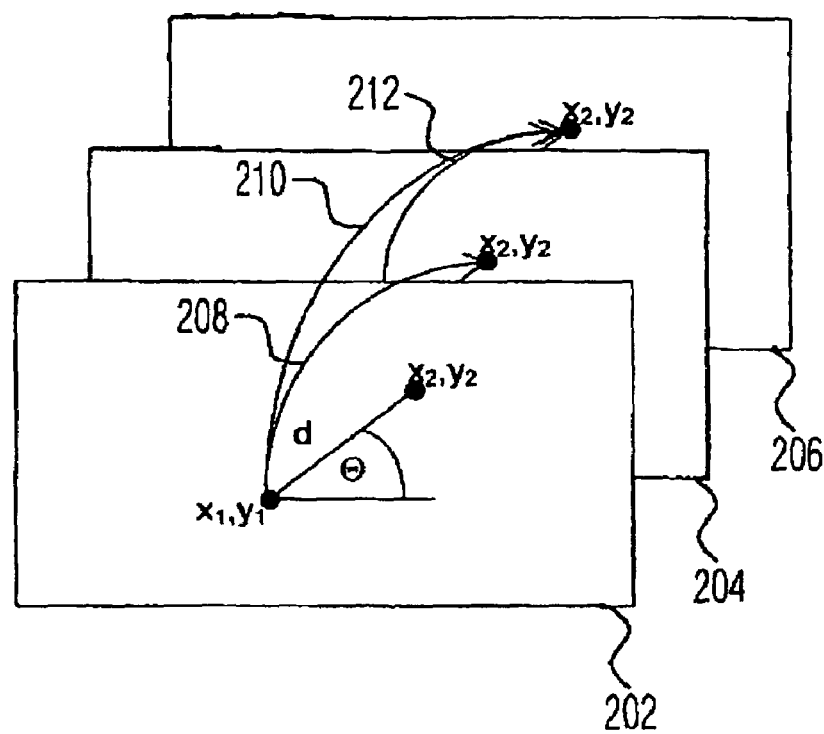
FIG. 4 are three levels of an image portion or an image obtained by a color picture, and which are underlying the determination of the histograms according to a first embodiment of the present invention.

These spectral- and level-extended sum and difference histograms are described with regard to FIG. 4. In FIG. 4, three levels 202, 204, 206 (e.g. R, G, B) are shown, which are obtained by a color picture of the image or the image portion. In the individual levels 202, 204, 206 (also referred to as channels) individual pixels—similar to FIG. 2—are shown and represented by their x,y coordinate. The level-overlapping processing is indicated by arrows 208, 210, 212. In the represented embodiment, there exists a linkage of a pixel $x_1/y_1$ in the first level 202 with a pixel $x_2/y_2$ in the second level 204 (see arrow 208), which can be displaced (d) from the pixel $x_1/y_1$ in the first level 202 and with a pixel $x_2/y_2$ in the third level 206 (see arrow 210), which can be displaced from the pixel $x_1/y_1$ in the first level 202 (by the same amount d). Further, there exists a linkage of a pixel $x_1/y_1$ in the second level 204 with a pixel $x_2/y_2$ in the third level 206 displaced therefrom (see arrow 212). The displacement is determined by the parameter d.

The interlevel sum and difference histograms are defined as follows:

$$h_S^{(pq)}(i)=|\{(x_1,y_1)\in D|I^{(p)}(x_1,y_1)+I^{(q)}(x_2,y_2)=i\}|$$

$$h_D^{(pq)}(j)=|\{(x_1,y_1)\in D|I^{(p)}(x_1,y_1)-I^{(q)}(x_2,y_2)=j\}|$$

with:
p,q=level, channel with p≠q,
i=0, . . . , 2(G−1),
j=−G+1, . . . , G−1,
G=maximum color value
$I^{(p)}$=intensity of a pixel in level p at location $x_1/y_1$,
$I^{(q)}$=intensity of a pixel in level q at location $x_1/y_1$,
x,y=coordinate of a viewed pixel in the image,
D=image portion,
$h_S$=extended sum histogram, and
$h_D$=extended difference histogram.

Due to the associativity of summation and subtraction in the example of the three-channel image (channels 1, 2 and 3), only three pairs
$h_S^{(12)}$, $h_D^{(12)}$
$h_S^{(13)}$, $h_D^{(13)}$
$h_S^{(23)}$, $h_D^{(23)}$ are required for an inclusion into three spectral channels. For the interlevel method with three levels, the feature vector is three times longer than in the above-described original approach. It should further be noted that for interlevel features, a displacement of d=0 can be chosen in an undefined direction θ. In that case, the direct correlation between the pixels between the channels is expressed at every pixel position $x_1/y_1$. For this embodiment, displacement d and direction θ are the above-mentioned boundary conditions (see Block 100 in FIG. 1).

Apart from generating the histograms through the above-described possibilities, which is the primary possibility for extending the features, other new specific color features can be introduced. From the table in FIG. 3, it can be seen that the features $c_{12}$, $c_{13}$ and $c_{14}$ are derived from both histograms (sum and difference histogram). Instead of only applying the base set of characteristics $\{c_i\}$ on the histograms of every separate level, new features can be constructed. These are defined by combining derived features from histograms from different levels, which result in:

$$c_{12}^{(pq)}=c_1^{(p)}-c_{10}^{(q)}$$

$$c_{13}^{(pq)}=c_2^{(p)} \cdot c_6^{(q)}$$

$$c_{14}^{(pq)}=c_3^{(p)}+c_7^{(q)}$$

Now, new features are available in the multispectral image, which can be calculated for every direction θ. When no cumulation of histograms is used, this leads to 36 so-called cross-histogram features.

A second group of new features is based on the cross correlation between the histograms of the different levels. The cross-performance features are defined as follows:

$$c_{PS}^{(pq)}=\Sigma_i \hat{P}_S^{(p)}(i)\hat{P}_S^{(q)}(i)$$

$$c_{PD}^{(pq)}=\Sigma_i \hat{P}_D^{(p)}(i)\hat{P}_D^{(q)}(i)$$

if it is: p≠q.

More particularly, there are six features for each of the four directions θ, when they are applied to RGB image, which leads to 24 features all in all. Naturally, more features can be defined, and these features can be applied to the interlevel method and the methods described below.

A further embodiment for introducing spectral information into features extraction is the usage of a distance measure in the color space. The L2 measure (Euclid distance) is used to calculate a scalar measure from the spectral values of a pixel pair. On a multispectral image with the color levels $I^{(p)}$, the L2 norm of a color vector is defined as follows:

$$\|\vec{I}(x,y)\|_{L2}=\sqrt{\Sigma_p (I^{(p)}(x,y))^2}$$

Therefore, the norm of the sum vector is used in the definition of the sum histograms with:

$$s(x_1,y_1)=\|\vec{I}(x_1,y_1)+\vec{I}(x_2,y_2)\|_{L2}$$

$$h_S(i)=|\{(x_1,y_1)\in D|S(x_1,y_1)=i\}|$$

with:
i=0, . . . , 2 (G−1) $\sqrt{3}$

Due to the different extreme values of the norm of a sum and difference vector, respectively, the length of the histograms differs. Apart from that, the difference will only take on positive values when simply the norm of difference vector, which is defined as $$d(x_1,y_1)=\|\vec{I}(x_1,y_1)-\vec{I}(x_2,y_2)\|_{L2}$$

is used. Thus, the direction of the difference vector is used by changing the sign when the plurality of vector elements is negative. By omitting the coordinate indication, this can be formulated in the RGB space as $$d = \begin{cases} -\hat{d} & \text{if } d^{(p)} < 0 \text{ for two or more } p \\ \hat{d} & \text{else} \end{cases},$$

when $d^{(p)} = I^{(p)}(x_1, y_1) - I^{(p)}(x_2, y_2)$ are the scalar level differences. Thus, the difference histograms can be defined as follows by using the L2 norm:

$$h_D(j) = |\{(x_1, y_1) \in D | d(x_1, y_1) = j\}|$$

when $j = -(G-1)\sqrt{3}, \ldots, (G-1)\sqrt{3}$. For an image with three 8-bit channels, this corresponds to histograms of 883 entries. Since the L2 norm leads to fractions in most cases, these are simply associated to an integer number entry (bin) by rounding.

Color spaces, which can be detected by perception as uniform, are known for their characteristic that distances in the color space are closely related to the human perception. Motivated by the fact that the Euclid distance in the L*u*v* space corresponds to the perceivable distance of ordinary people, this distance measure is applied to the L*u*v* representation for a feature calculation.

The L*u*v* space has been standardized in 1976 by the CIE and is derived from the XYZ space together with a white reference point $(X_n, Y_n, Z_n)$, which is the transformed normalized RGB vector (1, 1, 1). For the further description, the following definition is assumed:

$$\begin{pmatrix} X \\ Y \\ Z \end{pmatrix} = \begin{pmatrix} 0.4125 & 0.3576 & 0.1804 \\ 0.2127 & 0.7152 & 0.0722 \\ 0.0193 & 0.1192 & 0.9502 \end{pmatrix} \begin{pmatrix} r \\ g \\ b \end{pmatrix}$$

The luminance component L* is indicated as follows:

$$L^* = \begin{cases} 116 \left(\frac{Y}{Y_n}\right)^{\frac{1}{3}} - 16 & \text{if } \frac{Y}{Y_n} > 0.008856 \\ 903.3 \left(\frac{Y}{Y_n}\right) & \text{else} \end{cases}$$

In order to calculate the chrominance components u* and v*, several intermediate sizes are necessary. When $u'_n$, $v'_n$ are dependent only on the white reference point, the following applies:

$$u'_n = \frac{4X_n}{X_n + 15Y_n + 3Z_n}$$

$$v'_n = \frac{9X_n}{X_n + 15Y_n + 3Z_n}$$

$$u' = \frac{4X}{X + 15Y + 3Z}$$

$$v' = \frac{9X}{X + 15Y + 3Z}$$

$$u^* = 13L * (u' - u'_n)$$

$$v^* = 13L * (v' - v'_n)$$

The highly non-linear character of the L*u*v* space can be visualized by converting the colors from the discrete RGB square and by applying the results. For some trivial color values, the conversion into L*u*v* is summarized in the table in FIG. 5. The values in bold show the minimum and maximum values, respectively, in the L*u*v* space. The color black with a zero intensity in all channels is a singularity and leads to undefined components u*, v*.

With these extreme values, the Euclid color distance leads to the following maximum values of the distance and the sum, respectively:

$$d_{uv,\max} = \sqrt{\sum_l \left(I_{\max}^{(l)}(x, y) - I_{\min}^{(l)}(x, y)\right)^2} = 367.32$$

$$s_{uv,\max} = 2\sqrt{\sum_l \left(\max\{|I_{\max}^{(l)}(x, y)|, |I_{\min}^{(l)}(x, y)|\}\right)^2} = 484.21$$

with $l \in \{L^*, u^*, v^*\}$.

Thus, the sum histogram is valuable in the range [0; 485] and the difference histogram at [−368; 368] by rounding the maxima to the next higher total number. The common length of sum and difference histograms is obtained in the implementation by stretching the sum histogram to [0; 736].

Instead of the highly correlated and symmetrical RGB color space, the HSV color model (HSV=hue, saturation, value) can be used in texture classification.

The hue value H is an angle measure around the V axis in a cylindrical coordinate system, wherein a hexagonal cone can represent this model. The representation of red, starting with an angle of 0, is chosen more or less arbitrarily according to different definitions in literature. Value V measures the luminance and value S the color saturation or the hue purity. Gray levels, for which R=G=B applies, singularities are in the HSV space and can be found on the V axis, when S=0 and H is undefined. A further singularity is V=0, which is pure black. For the present description, a conversion by using the normed r, g, b $\in [0; 1]$ is used:

$$V = \max\{r, g, b,\}$$

$$S = \begin{cases} 1 - \frac{\min\{r, g, b\}}{\max\{r, g, b\}} & \text{if } \max\{r, g, b\} > 0 \\ 0 & \text{else} \end{cases}$$

$$H = \begin{cases} \frac{g - b}{\max\{r, g, b\} - \min\{r, g, b\}} \cdot \frac{\pi}{3} & \text{if } \max\{r, g, b\} = r \\ \frac{b - r}{\max\{r, g, b\} - \min\{r, g, b\}} \cdot \frac{\pi}{3} + \frac{2\pi}{3} & \text{if } \max\{r, g, b\} = g \\ \frac{r - g}{\max\{r, g, b\} - \min\{r, g, b\}} \cdot \frac{\pi}{3} + \frac{4\pi}{3} & \text{if } \max\{r, g, b\} = b \end{cases}$$

Figure 6:
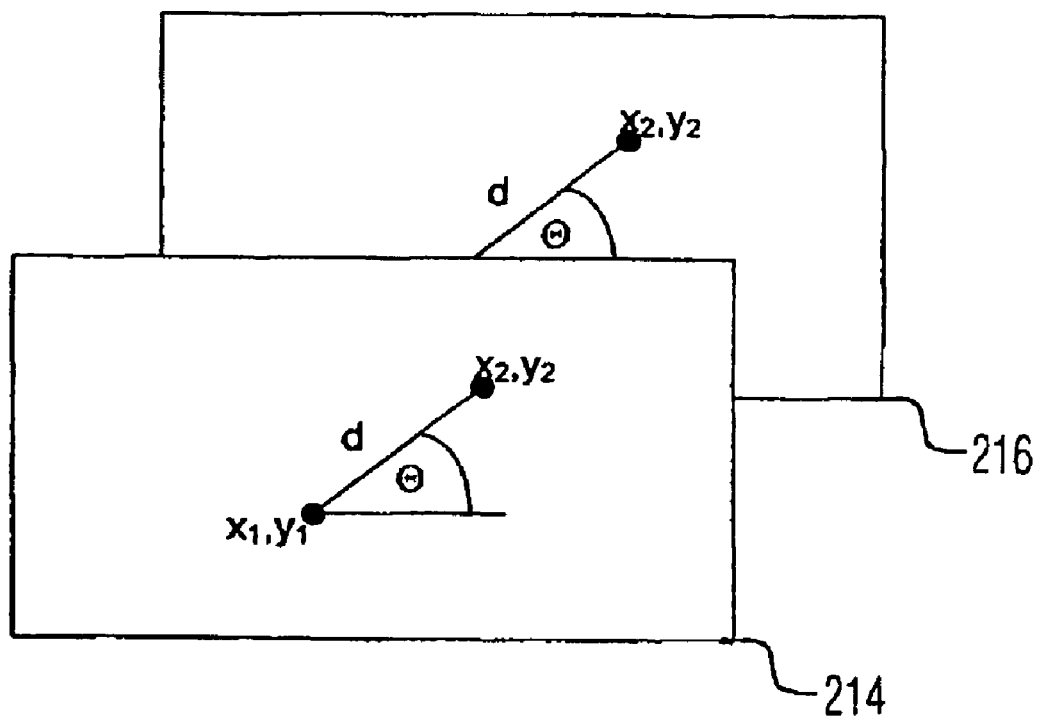
FIG. 6 is the H level and the V level where the sum and difference histograms are calculated according to an alternative implementation of the first embodiment.

FIG. 6 shows the two levels or channels 214, 216, the H level and the V level with the pixels $x_1/y_1, x_2/y_2$ existing in this approach.

For small saturation values, the hue reacts highly sensitive to sensor noise in the image. Thus, the information from the H channel is only used for texture classification when a certain saturation threshold $S_{min}$ is exceeded. Otherwise, the set H is set to an arbitrary but constant value, e.g.

$$H' = \begin{cases} H & \text{if } S \geq S_{\min} \\ 0 & \text{else} \end{cases}$$

The conversion of the difference and sum histograms to the HSV space can be difficult, since the H canal is an angle representation. The hue values vary between 0 and $2\pi$, which is the same hue. This difficulty is solved when the previous definitions for the sum and difference histograms are used. Therefore, a distance measure is used, which is maximum for ΔH=π:

$$d = \sin\left(\frac{\Delta H}{2}\right) = \sin\left(\frac{H_1 - H_2}{2}\right)$$

For summation, the range of [0; 2π] can be exceeded, but a measure is used, which is maximum for $H_1+H_2$ mod $2\pi=\pi$. It has to be considered that the modulo operation is implicit when calculating the sinus:

$$s = \sin\left(\frac{H_1 + H_2 \bmod 2\pi}{2}\right) = \sin\left(\frac{H_1 + H_2}{2}\right)$$

To establish discrete histograms, these definitions are scaled onto the same region as in the gray level case, which is [−255; 255] and [0; 510] respectively:

$$s^{(H')}(x_1, y_1) = 510 \sin\left(\frac{I^{(H')}(x_1, y_1) + I^{(H')}(x_2, y_2)}{2}\right)$$

$$d^{(H')}(x_1, y_1) = 255 \sin\left(\frac{I^{(H')}(x_1, y_1) - I^{(H')}(x_2, y_2)}{2}\right)$$

The features are then defined from the sum and difference histograms on the H' and V level as follows:

$h_S^{(H')}(i) = |\{(x_1,y_1) \in D | s^{(H')}(x_1,y_1) = i\}|$ $h_D^{(H')}(i) = |\{(x_1,y_1) \in D | d^{(H')}(x_1,y_1) = i\}|$ $h_S^{(V)}(i) = |\{(x_1,y_1) \in D | I^{(V)}(x_1,y_1) + I^{(V)}(x_2,y_2) = i\}|$ $h_D^{(V)}(j) = |\{(x_1,y_1) \in D | I^{(V)}(x_1,y_1) - I^{(V)}(x_2,y_2) = j\}|$

Second Embodiment

Below, a second embodiment of the present invention will be discussed in more detail, where the classification is based on a binary mask, which is obtained by comparing the pixel intensities in associated pixels in different levels with a threshold. First, again, a known approach for gray level images is discussed.

A geometrical class of texture algorithms is based on the so-called SGF approach (SGF=Statistical Geometrical Feature), which is described in more detail by Y. Q. Chen et al. in "Statistical Geometrical Features for Texture Classification", Pattern Recognition, Vol. 28, No. 4, pages 537–552, September 1995. According to this approach, 16 statistical features are calculated based on the geometrical characteristics of connected pixel areas in a series of binary pictures. These binary pictures are generated by a threshold operation with regard to the intensity image. Geometrical characteristics, like the number of connected areas and their irregularity, are used together with their statistics (mean deviation, standard deviation), which describe the stack of binary images.

Figure 7:
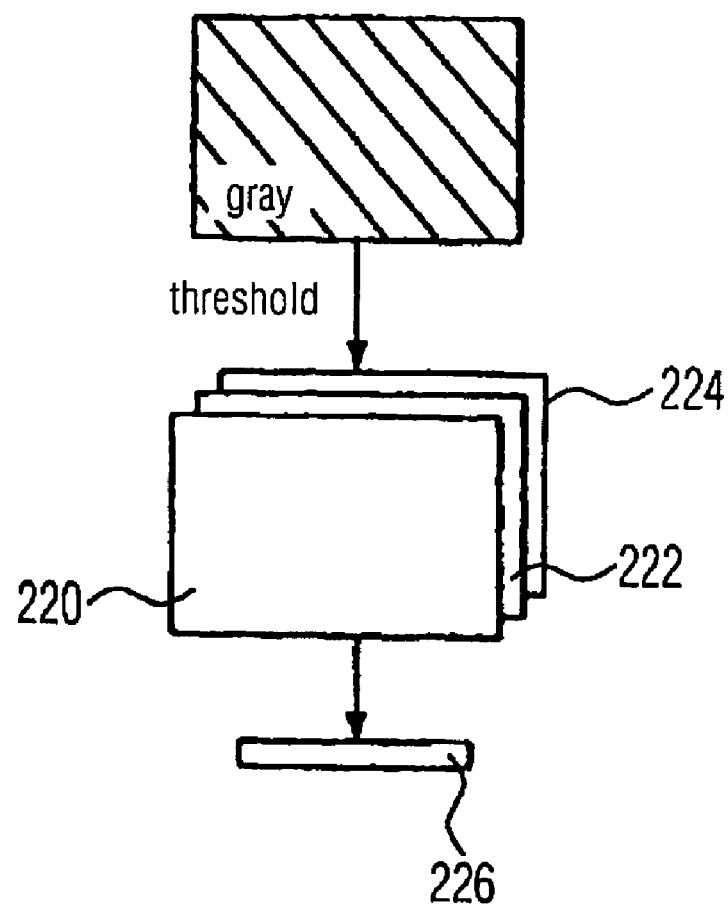
FIG. 7 is the generation of a binary mask stack from a gray level image for the generation of statistical geometrical gray level features.

FIG. 7 shows a gray level image 218, from which a binary stack with three binary masks 220, 222, 224 is generated by the threshold operation. From the binary masks 220, 222, 224, the feature vector 226 for the subsequent classification is determined. After binarization with different threshold values, statistical geometrical features are calculated from the binary image stack.

For an image I(x, y) with G gray levels, a binary image $I_{B\alpha}(x, y)$ can be obtained by threshold operations with a threshold value $\alpha \in [1; G-1]$, which leads to $$I_{B\alpha}(x, y) = \begin{cases} 1 & \text{if } I(x, y) \geq \alpha \\ 0 & \text{else} \end{cases}$$

The stack of all possible G−1 binary images $I_{B\alpha}(x, y)$ with $\alpha=1, \ldots, G-1$ is equal to the original image without information loss, since $$I(x, y) = \sum_{\alpha=1}^{G-1} I_{B\alpha}(x, y)$$

This is due to the fact that for a pixel with I(x, y)=k, exactly k binary images with $\alpha \leq k$ will have a value of 1 at this position. A feature calculation loss of information does, however, not provide any reason for concern, since the discriminating information is retained between different classes of textures. Thus, a reduced set of binarization levels can be used, which is parameterized by an initial threshold $\alpha_0$ and a step size $\Delta\alpha$. The series of threshold images is obtained by:

$\alpha_i = \alpha_0 + i\Delta\alpha$ with $i=0, \ldots, L_{Bins}-1$. The initial threshold $\alpha_0$ and the step size $\Delta\alpha$ are the above-mentioned boundary conditions for this embodiment (see Block 100 in FIG. 1).

Typical values for these parameters as well as the number of binary masks producible thereby are shown in the table in FIG. 8. The number of binary images $L_{Bins}$, which should be as small as possible under consideration of the classification behavior in contrast to the runtime complexity is determined by:

$$L_{Bins} = \left\lfloor \frac{G - \alpha_0}{\Delta\alpha} \right\rfloor$$

Within every binary image, connected regions using the four-neighborhoods are extracted from the one-value and zero-value pixels, respectively. By using these regions, the number of connected regions (NOC) of the k-value pixel with $k \in \{0, 1\}$ is referred to as $NOC_k(\alpha)$. The total number of k-value pixels within a region $R_i$ is referred to as $NOP_k(i, \alpha) = |R_i|$. Additionally, the irregularity (IRGL) of every region $R_i$ is defined as follows:

$$IRGL_k(i, \alpha) = \frac{1 + \sqrt{\pi} \max_{j \in R_i} \sqrt{(x_j - \bar{x}_i)^2 + (y_j - \bar{y}_i)^2}}{\sqrt{|R_i|}} - 1$$

wherein $$\bar{x}_i = \frac{\sum_{j \in R_i} x_j}{|R_i|}, \bar{y}_i = \frac{\sum_{j \in R_i} y_j}{|R_i|}$$

are the mass centers of the respective region. Now, for every threshold α, the weighted mean irregularity of regions within the respective binary image $I_{B\alpha}(x, y)$ is calculated as follows:

$$\overline{IRGL_k}(\alpha) = \frac{\sum_i NOP_k(i, \alpha) IRGL_k(i, \alpha)}{\sum_i NOP_k(i, \alpha)}$$

wherein the weighting is determined by the number of pixels $NOP_k(i, \alpha)$ within every region $R_i$. From the four functions $NOC_0(\alpha)$, $NOC_1(\alpha)$, $IRGL_0(\alpha)$ und $IRGL_1(\alpha)$, four statistical measures are obtained, which are represented in the table in FIG. 9, wherein $g(\alpha)$ is one of the four functions of $\alpha$. This leads to a total amount of 16 features, which are characteristic for different textures. The features derived from the functions $NOC_0(\alpha)$ and $NOC_1(\alpha)$, which are the numbers of connected regions per binarization level, describe the coarseness of a texture. Large average values of these parameters can be interpreted as a large number of regions, which represent a fine structure. The standard deviation per NOC describes the variance for different thresholds and thus how strong these differences are from adjacent gray levels.

Further, the irregularity measures allow a characterization of the texture appearance with regard to small compact structures, such as gravel, or long structures, such as on wood cutting surfaces.

According to the second embodiment of the present invention, the disadvantages of the above-described approach for determining the required features for classification are avoided, by extending this approach to the viewing of several levels. Similar to the above-described inter-level approach, which is used for the sum histogram and difference histogram features, a binary operation can be used between the intermediate representations (levels) to detect interlevel dependencies. The three basic Boolean operations AND, OR and XOR are a solution.

Figure 10:
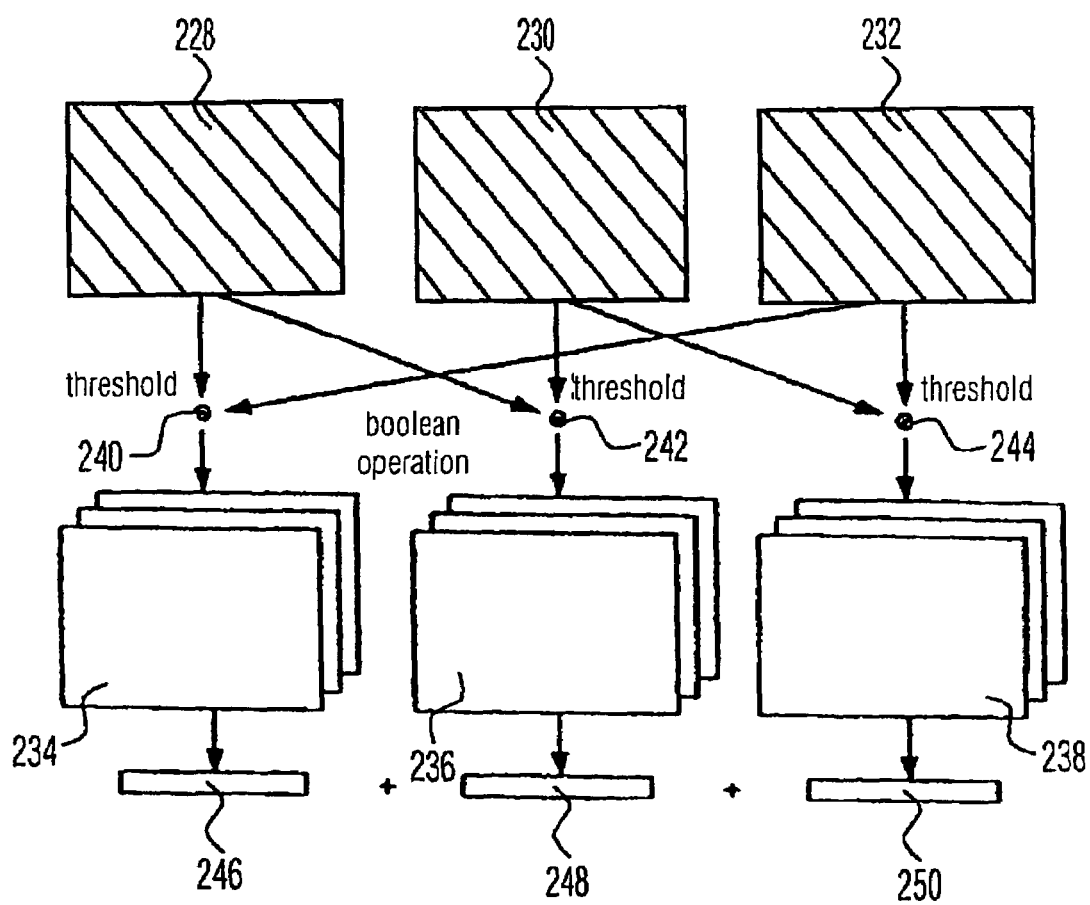
FIG. 10 is the generation of combined binary stacks of n=3 levels of an image, to generate statistical geometrical interlevel features according to a second embodiment of the present invention.

FIG. 10 shows how combined binary stacks are generated or, for example, three levels (e.g. RGB) of an image, to generate statistical geometrical interlevel features. In FIG. 10, the three levels 2 to 8, 230, 232 are shown, which are obtained in a multichannel picture of the image. For each of the levels, a binary stack 234, 236, 238 is generated with a plurality of binary masks, by combining the intensities from the initial levels by Boolean operations, as it is shown in FIG. 10 at 240, 242, 244. More particularly, after the threshold operation, a Boolean operation is applied between the different levels 228, 230, 232 and the resulting binary stacks 234, 236, 238 (image stack) are used for feature calculation.

For a color image $I(x, y)$ with channel indices $p \neq q$, binary interlevel images $I^{(pq)}_{B\alpha}(x, y)$ can be obtained by $$I^{(pq)}_{B\alpha}(x, y) = I^{(p)}_{B\alpha}(x, y) \odot I^{(q)}_{B\alpha}(x, y)$$

$$I^{(p)}_{B\alpha}(x, y) = \begin{cases} 1 & \text{if } I^{(p)}(x, y) \geq \alpha \\ 0 & \text{else} \end{cases}$$

wherein $\odot$ is one of the Boolean operations AND, OR and XOR and $p, q \in \{R, G, B\}$. In the image space with three channels, this leads to three binary stacks or masks $I^{(pq)}_{B\alpha}$ for a feature calculation. Therefrom, the feature vectors 246, 248, 250 result, which are concatenated, which results in 48 features.

The intermediate images $I^{(pq)}_{B\alpha}$ do not have to be calculated explicitly. Therefore, for every Boolean operation $\odot$ alternative formulations are given. A coordinate indexing (x, y) is omitted due to brevity. The AND operation can be implemented by a minimum operation and a subsequent comparison, if $$I^{(pq)}_{B\wedge\alpha} = \begin{cases} 1 & \text{if } \min\{I^{(p)}, I^{(q)}\} \geq \alpha \\ 0 & \text{else} \end{cases}$$

A similar formulation can be provided by using the maximum operation for the OR operation:

$$I^{(pq)}_{B\vee\alpha} = \begin{cases} 1 & \text{if } \max\{I^{(p)}, I^{(q)}\} \geq \alpha \\ 0 & \text{else} \end{cases}$$

As a special case, only the XOR operation requires two comparison operations and is thus formulated as follows:

$$I^{(pq)}_{B\oplus\alpha} = \begin{cases} 1 & \text{if } (I^{(p)} - \alpha)(I^{(q)} - \alpha) \leq 0 \wedge I^{(p)} \neq I^{(q)} \\ 0 & \text{else} \end{cases}$$

corresponding to a minimum operation, the AND operation produces smaller single-value regions than the OR operations, which uses the maximum of two channel intensities. If only one of the base colors (RGB) is dominant or weak, larger homogenous regions result from the threshold operation. The more complex XOR operation maintains structures with dominating base colors, but suppresses regions with similar or mixed color values.

Similar to the first embodiment, the features in the HSV space can be generated. For the SGF, the HSV space subjected to a threshold operation has to be used. It should be noted that it does not lead to a double threshold operation, since the hue channel H is subjected to a threshold operation with regard to the corresponding saturation value S of a certain pixel. For constructing the binary stack on the H'V space, every channel is processed individually.

Figure 11:
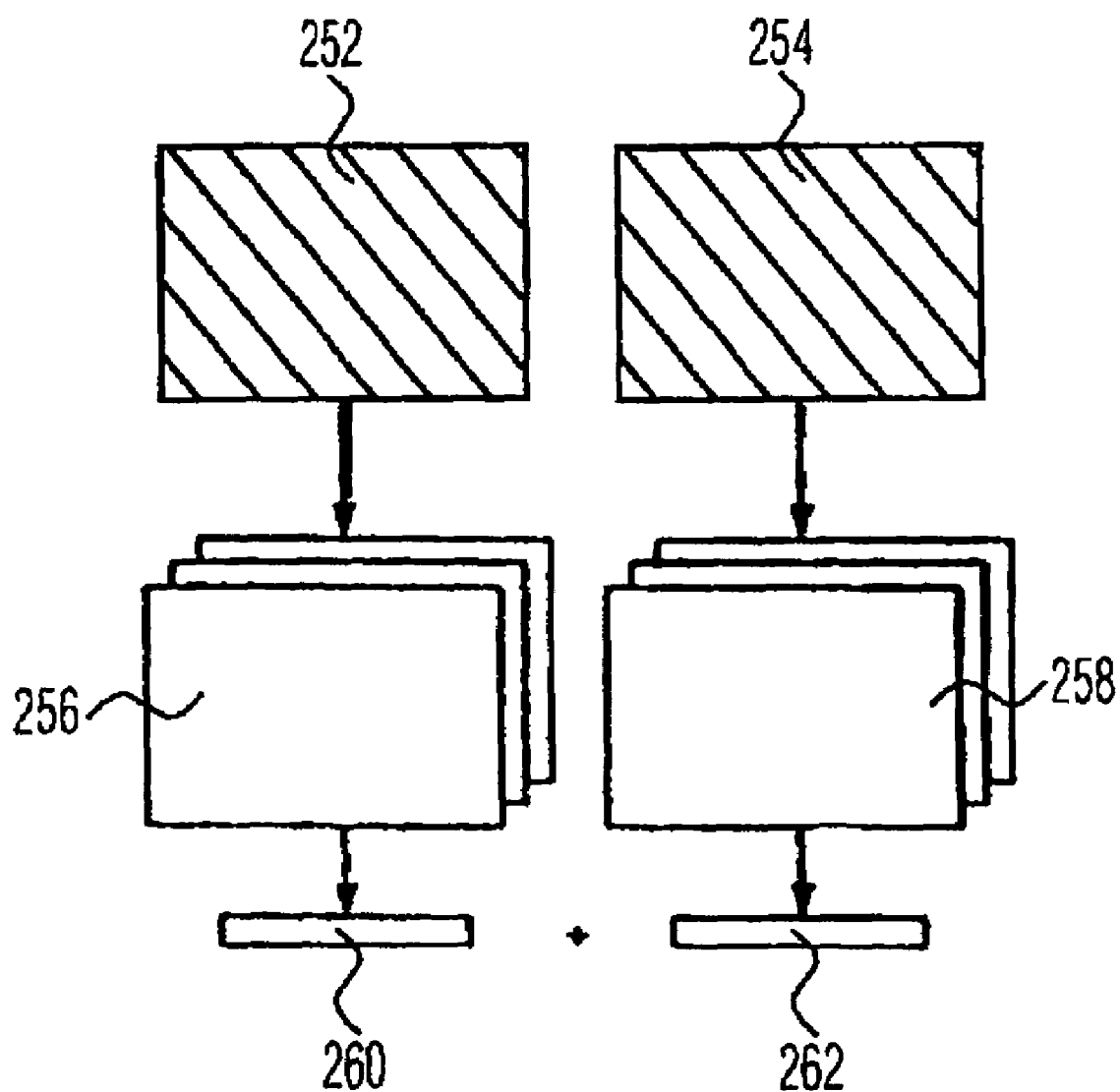
FIG. 11 is the generation of combined binary stacks for calculating statistical geometrical features from an HSV image according to an alternative implementation of the second embodiment, wherein the H'V representation is obtained by subjecting a hue to a threshold operation with regard to the saturation.

Every binary stack is treated separately and the features are calculated independently, which results in a vector of 32 entries. In FIG. 11, the H level 252 and the V level 254 are shown, which are generated by capturing the image. From the levels 252, 254, the binary stacks 256 and 258 with a plurality of binary masks are formed by a threshold operation. The feature vectors 260 and 262 are generated from the binary stacks 256 and 258.

If, however, the hue channel H' subject to a threshold operation is a circular representation, similar colors could end in different entries after the binarization. Thus, a trigonometrical transformation is performed, which is defined as $$f = H'_0 \sin\left(\frac{H'}{2}\right)$$

which results in a monotonous function with regard to the distance from the reference point at $H=0$. A scaling factor $H'_0=255$ is helpful to obtain similar values as for the gray levels. This measure solves the problem of similar colors in different entries.

EXAMPLES

Four different color image sets were classified by using the inventive approaches. Two sets (VisTex, BarkTex) were chosen because they have already been described and evaluated in the image processing literature, the other two sets were selected due to their practical relevance in medical (cervix cells) and industrial applications (wood defects).

The Vision Texture Database (VisTex) of the Massachusetts Institute of Technology (MIT) is a selection of texture images, which serve as reference for image processing algorithms. The database contains more than 100 individual reference images and natural images with several textures. The size of the viewed region (ROI) was 64×64 pixel, while the original image size for 24-bit RGB colors was at 512×512 pixels.

The BarkTex database contains images of barks of six different types of tree, which are listed in the table in FIG. 12, where the English and Latin names are given. The original image size was 265×384 pixels for 24-bit RGB colors. Environmental influences such as moss or mushrooms, watering, ground condition and age of the trees led to a difficult classification problem.

For a cytological examination, portions of sample images of cell nucleuses of a cervix uterus were used from two different samples with healthy and dysplastic cell nucleuses. The size of the viewed region (ROI) was 32×32 pixel, while the original image size was 1000×700 pixels for 24-bit RGB colors.

For wood samples, images were used whose original image size for 24-bit RGB colors was 128×128 pixels. The texture classes are described in the table in FIG. 13. The digital image analysis can be used for the surface examination of wood blocks in sawmills. The images of simple spruce boards were captured by using a 24-bit CCD line scan camera, which was fixed across the conveyor belt.

For the sample images, the texture features were determined based on the above described inventive approaches. Based on the generated texture features, a classification of the images followed, wherein the results of the classification were compared to the results achieved by a classification, which was performed for the same images by using features generated according to conventional gray level approaches.

For the color extension according to the first embodiment, features were generated for the classification, which were calculated in the RGB space based on the color distance measure and in the HSV space by using the sum and different histograms generated there.

For multispectral images (interlevel method), the interlevel features were generated at an additional setting of a zero displacement of d=0, wherein the direction θ is undefined. The results are shown in the table represented in FIG. 14. Compared to conventional gray scale approaches, there is an improvement with regard to the absolute improvement measure Δr. The only exceptions are the cervix uterus cell nuclei with a deterioration of the detection rate. The reason is that these images are very gray in their appearance with strong camera noise. By using the weighted mean value for a gray representation, the noise is partly compensated and the classification stabilized, so that for these images also better results are obtained as in the gray level approach.

The color distance measure, which was applied to the sum and difference histograms, is the L2 norm or Euclid distance. Here, a different histogram length of 883 is required due to the different extreme values. Contrary to the interlevel method, the number of features does not increase, because all levels are treated simultaneously. The detection rates are shown in the table in FIG. 15. Compared to the respective gray level reference (see improvement Δr) substantially no changes result. Similar results were obtained by applying the Euclid distance features to the L*u*v representation of the images. There, a histogram length of 737 was used.

In the non-linear extension into the HSV space, prior to the feature calculation, a threshold operation is applied to the hue channel H with regard to the saturation S. The leaving one out classification was applied to the images with six different thresholds $S_{min} \in \{0, 25, 50, 100, 150, 200\}$ subjected to a threshold operation. The best results for the interlevel features on the resulting H'V are summarized in the table in FIG. 16 in the upper portion. Motivated by the circular nature of the hue H, a trigonometrical distance measure was introduced. Thereby, features on the V and H' level were calculated separately and the results are shown in the lower portion of the table in FIG. 15.

In summary, it has to be noted that the interlevel and non-linear H'V features with a threshold $S_{min}=50$ show a significantly better behavior than the original features on the gray scale images. The best results are summarized in the table in FIG. 17.

For the color extension according to the second embodiment, features have been generated for the classification, which have been calculated in the RGB space based on the color distance measure and in the HSV space by using the binary masks generated there.

In the extension into the linear color spaces, the interlevel SGF features are derived from Boolean operations between the binary image stacks from separate levels and applied to the symmetrical RGB space. As can be seen from the table shown in FIG. 18, significant improvements result compared to comparable gray level approaches.

In the non-linear extension into the HSV space, the non-linear H'V features use the hue and value level independently of one another. H' results from the threshold operation of the hue H with regard to the saturation S, which is performed here for six different thresholds $S_{min} \in \{0, 25, 50, 100, 150, 200\}$. The results are given in the table in FIG. 19.

Although the inventive method has been described with regard to embodiments where a color image or a color image portion has been used as three channel image, the present invention is not limited thereto. The image sequence and the image, respectively, can have been generated by an n channel, $n \geq 2$, picture. The calculation of the numerical features for each of the regions takes place by using all or part of the channels of the image, wherein each of the channels can contain different multispectral data/information instead of the color data, such as information based on IR radiation, UV radiation, X-ray radiation, etc.

Thus, it can be seen from the above described results, that the usage of texture features in a classification, which have been obtained by the inventive method, provides consistently better classification results than would have been obtainable from conventional gray scale approaches due to the concatenation of information available from the individual image channels.

Although square image portions have been used to determine texture features in the above description of the preferred embodiments, the present invention is not limited thereto. Rather, the inventive method can be applied to portions formed in any way. The form of the portions can, for example, be adapted to the form of an object in the image whose texture features are to be determined, which has the advantage that only the pixels associated to the object have to be processed. The image portion can, for example, be adapted to the form of a cell nucleus or skin melanoma to be examined.

In the above description of the preferred embodiments, the conversions of the RGB data into the HSV color space or the L*u*v color space has been described. Instead of these described conversions, the RGB data can also be converted to other known color spaces.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Method for extracting texture features from an image, comprising a plurality of pixels, comprising:
   (a) for each of the plurality of pixels, comparing the pixel intensity of the pixel with a threshold to generate a binary mask, comprising a first binary value for every pixel when the pixel intensity exceeds the threshold, or a second binary value when the pixel intensity does not exceed the threshold;
   characterised in that
   the image is a multichannel image and the step (a) is repeated for each of the channels to generate a binary mask for each of the channels; and
   the method further comprises the following steps:
   (b) for each of the plurality of pixels of at least two different channels, logically combining the binary values for the pixel in the binary mask associated to the first channel with the binary value for the pixel in the binary mask associated to the second channel to obtain a binary interlevel image; and
   (c) determining one or several texture features from the binary interlevel image.

2. Method of claim 1, wherein the step (b) is repeated until binary interlevel images are present for all combinations of different channels of the image.

3. Method of claim 1, wherein the determined texture features are integrated into one or several total texture features of the multichannel image.

4. Method of claim 3, wherein integrating the texture features comprises generating a texture vector for the multichannel image, wherein the determined texture features are stored.

5. Method of claim 1, wherein the image is generated by a multichannel picture, wherein the channels of the image contain different color information or different multispectral information, wherein the other multispectral information is based on pictures by IR radiation, UV radiation or X-ray radiation.

6. Method of claim 5, wherein, when the channels of the image contain color information, information with regard to the color of the image, with regard to the luminance and the chrominance of the image or with regard to the hue of the image, the saturation of the image and the value of the image is associated to the channels.

7. Method of claim 1, wherein the image from which the texture features are to be extracted is a portion of an overall image formed in any way.

* * * * *